United States Patent
Wang et al.

(10) Patent No.: US 11,749,870 B2
(45) Date of Patent: Sep. 5, 2023

(54) POSITIVE ELECTRODE PLATE AND ELECTROCHEMICAL DEVICE

(71) Applicant: Contemporary Amperex Technology Co., Limited, Ningde (CN)

(72) Inventors: Yaohui Wang, Ningde (CN); Zhenhua Li, Ningde (CN); Xing Li, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 282 days.

(21) Appl. No.: 16/422,869

(22) Filed: May 24, 2019

(65) Prior Publication Data

US 2020/0161623 A1 May 21, 2020

(30) Foreign Application Priority Data

Nov. 16, 2018 (CN) .......................... 201811367011.8

(51) Int. Cl.
*H01M 50/581* (2021.01)
*H01G 11/18* (2013.01)
(Continued)

(52) U.S. Cl.
CPC .......... *H01M 50/581* (2021.01); *H01G 11/18* (2013.01); *H01G 11/68* (2013.01);
(Continued)

(58) Field of Classification Search
None
See application file for complete search history.

(56) References Cited

U.S. PATENT DOCUMENTS

| 2001/0041285 A1* | 11/2001 | Shiota | H01M 4/624 429/62 |
| 2012/0058375 A1* | 3/2012 | Tanaka | H01M 4/366 429/94 |
| 2015/0125757 A1* | 5/2015 | Kato | H01M 4/661 429/245 |
| 2017/0331146 A1* | 11/2017 | Haba | H01M 4/13 |

FOREIGN PATENT DOCUMENTS

| CN | 101276940 A | 10/2008 |
| CN | 103904294 A | 7/2014 |

(Continued)

OTHER PUBLICATIONS

Machine translation of CN 107437622 (Liu) (Year: 2017).*
(Continued)

*Primary Examiner* — Maria Laios
(74) *Attorney, Agent, or Firm* — East IP P.C.

(57) ABSTRACT

The present invention relates to a positive electrode plate and an electrochemical device. The positive electrode plate comprises a current collector, a positive active material layer and a safety coating disposed between the current collector and the positive active material layer, wherein the safety coating comprises a polymer matrix, a conductive material and an inorganic filler, wherein the polymer matrix comprises at least two types of polymer materials, and the first type of polymer material is fluorinated polyolefin and/or chlorinated polyolefin, and the solubility of the second type of polymer material in oil solvent is smaller than the solubility of the first type of polymer material; and the weight percentage of the first type of polymer material relative to the total weight of the polymer matrix, the conductive material and the inorganic filler is 17.5% or more. The positive electrode plate improves high temperature safety of electrochemical device.

11 Claims, 1 Drawing Sheet

(51) Int. Cl.
    *H01G 11/68* (2013.01)
    *H01M 4/66* (2006.01)
    *H01M 4/62* (2006.01)
    *H01M 10/052* (2010.01)
    *H01M 10/0525* (2010.01)
    *H01M 10/42* (2006.01)
    *H01M 4/06* (2006.01)
    *H01M 6/50* (2006.01)
    *H01G 11/70* (2013.01)
    *H01M 4/02* (2006.01)

(52) U.S. Cl.
CPC .............. *H01M 4/06* (2013.01); *H01M 4/622* (2013.01); *H01M 4/623* (2013.01); *H01M 4/624* (2013.01); *H01M 4/625* (2013.01); *H01M 4/626* (2013.01); *H01M 4/661* (2013.01); *H01M 4/663* (2013.01); *H01M 4/667* (2013.01); *H01M 4/668* (2013.01); *H01M 6/50* (2013.01); *H01M 10/052* (2013.01); *H01M 10/0525* (2013.01); *H01M 10/4235* (2013.01); *H01G 11/70* (2013.01); *H01M 2004/028* (2013.01); *H01M 2200/106* (2013.01); *Y02E 60/10* (2013.01)

(56) References Cited

FOREIGN PATENT DOCUMENTS

| | | | |
|---|---|---|---|
| CN | 105098193 | A | 11/2015 |
| CN | 105594019 | A | 5/2016 |
| CN | 107437622 | A | 12/2017 |
| CN | 107565137 | A | 1/2018 |
| CN | 109755467 | A | 5/2019 |
| EP | 3147971 | A1 | 3/2017 |
| EP | 3483900 | A1 | 5/2019 |
| EP | 3483907 | A1 | 5/2019 |
| EP | 3483954 | A1 | 5/2019 |
| JP | 2018116810 | A | 7/2018 |
| TW | 201836196 | A | 10/2018 |

OTHER PUBLICATIONS

PCT International Search Report for PCT/CN2019/118890, dated Feb. 6, 2020, 11 pages.
The partial European search report for European Application No. 19177520.4, dated Nov. 14, 2019, 20 pages.
The First Office Action and search report dated Sep. 1, 2020 for Chinese Application No. 201811367011.8, 10 pages.

\* cited by examiner

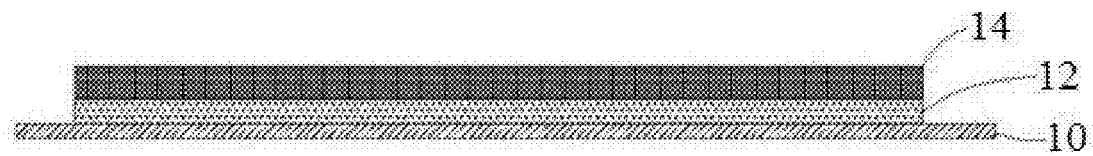

POSITIVE ELECTRODE PLATE AND ELECTROCHEMICAL DEVICE

CROSS-REFERENCE TO RELATED APPLICATION

This application claims priority to Chinese Patent Application No. 201811367011.8, filed on Nov. 16, 2018, which is hereby incorporated by reference in its entirety.

TECHNICAL FIELD

The present invention relates to the field of electrochemical technology, and more particularly, to a positive electrode plate and an electrochemical device containing the positive electrode plate.

BACKGROUND

Lithium-ion batteries are widely used in electric vehicles and consumer electronics because of their high energy density, high output power, long cycle life and small environmental pollution. However, lithium-ion batteries are prone to fire and explosion when subjected to abnormal conditions such as crushing, bumping or puncture, causing serious harm. Therefore, the safety problem of lithium-ion batteries greatly limits the application and popularity of lithium-ion batteries.

A large number of experimental results show that internal short circuit of lithium-ion battery is the basic cause of the battery's safety hazard. In order to avoid the internal short-circuit of the battery, researchers have tried to improve the battery in many ways, including the use of PTC materials to improve the safety performance of lithium-ion battery. A PTC (Positive Temperature Coefficient) material is a positive temperature coefficient heat sensitive material, which has the characteristic that its resistivity increases with increasing temperature. When the temperature exceeds a certain temperature, its resistivity increases rapidly stepwise.

In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even making the conductive path of the entire electrode active material layer to be destroyed. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when the active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer and also deteriorates its electrical properties. In addition, in the compacting step of the plate fabrication process, the PTC material layer is easily squeezed to the edge and thus the electrode active material layer would directly contact the current collector, so that the PTC material layer cannot improve the safety performance. In addition, it is required to greatly improve the performance of the PTC material layer, such as the response speed, the effect of blocking current, and the like.

In view of this, it is indeed necessary to provide an electrode plate and a battery having improved safety and battery performance, which are capable of solving the above problems.

SUMMARY

An object of the present invention is to provide an electrode plate and an electrochemical device with improved safety and electrical performances.

A further object of the present invention is to provide an electrode plate and an electrochemical device with good safety performance (especially, safety performance during nail penetration) and improved electrical performance (especially, cycle performance).

The present invention provides a positive electrode plate comprising a current collector, a positive active material layer and a safety coating disposed between the current collector and the positive active material layer, wherein the safety coating comprises a polymer matrix, a conductive material and an inorganic filler; and wherein the polymer matrix comprises at least two types of polymer materials, and first type of polymer material is fluorinated polyolefin and/or chlorinated polyolefin, and solubility of second type of polymer material in oil solvent is smaller than the solubility of the first type of polymer material; and wherein the weight percentage of the first type of polymer material relative to total weight of the polymer matrix, the conductive material and the inorganic filler is 17.5% or more. Preferably, relative to the total weight of the polymer matrix, the conductive material and the inorganic filler, the weight percentage of the polymer matrix is 35 wt. % to 75 wt. %, preferably 50 wt. % to 75 wt. %; the weight percentage of the conductive material is 5 wt. % to 25 wt. %, preferably 5 wt. % to 20 wt. %; and the weight percentage of the inorganic filler is 10 wt. % to 60 wt. %, preferably 15 wt. % to 45 wt. %.

The present invention also provides an electrochemical device comprising the positive electrode plate of the present invention, which is preferably a capacitor, a primary battery or a secondary battery.

DESCRIPTION OF THE DRAWINGS

The positive electrode plate, the electrochemical device and the beneficial effects of the present invention will be described in detail below with reference to the accompanying drawings and specific embodiments.

FIG. 1 is a schematic structural view of a positive electrode plate according to an embodiment of the present invention, in which 10—a current collector; 14—a positive active material layer; 12—a safety coating (i.e., PTC safety coating).

DETAILED DESCRIPTION

The present disclosure provides a positive electrode plate comprising a current collector, a positive active material layer and a safety coating disposed between the current collector and the positive active material layer, wherein the safety coating comprises a polymer matrix, a conductive material and an inorganic filler, and wherein the polymer matrix comprises at least two types of polymer materials, and the first type of polymer material is fluorinated polyolefin and/or chlorinated polyolefin, and the solubility of the second type of polymer material in oil solvent is smaller than the solubility of the first type of polymer material; and wherein the weight percentage of the first type of polymer material relative to the total weight of the polymer matrix, the conductive material and the inorganic filler is 17.5% or more.

FIG. 1 is a schematic structural view of a positive electrode plate according to some embodiments of the present invention, in which 10 represents a current collector; 14 represents a positive active material layer; 12 represents a safety coating (i.e., PTC safety coating).

It is easy to understand that FIG. 1 only shows the embodiment in which the PTC safety coating 12 and the positive active material layer 14 are only provided on one side of the positive electrode collector 10, however in other embodiments the PTC safety coating 12 and the upper positive active material layer 14 may be respectively disposed on both sides of the positive current collector 10.

Conventional coating having PTC effect for use in batteries generally includes a polymer matrix and a conductive material, wherein polyethylene, polypropylene or ethylene propylene copolymer or the like is generally used as the PTC matrix material. In this case, it is necessary to additionally add a binder to the PTC matrix material and the conductive material. If the binder content is too small, the binding force between the coating and the current collector is poor, and if the binder content is too large, the response temperature and response speed of the PTC effect are affected. In addition, it has been found that when the active material slurry is coated on the surface of the PTC material layer, the solvent (such as NMP) in the slurry would dissolve the polymer material of the PTC layer and thus the dissolved polymer material enters the upper active material layer, which not only destroys the PCT effect of the PTC layer and also deteriorates its electrical properties. In order to overcome the above drawbacks, the present invention proceeds from various aspects, and adopts various technical means to cooperatively improve the performance and stability of the PTC safety coating.

First of all, the inventors have found that stability and performance of the safety coating can be improved by selecting a polymer material of the safety coating.

The inventors have found that fluorinated polyolefin and/or chlorinated polyolefin can function as a polymer matrix material of a PTC thermistor layer. The safety coating composed of fluorinated polyolefin and/or chlorinated polyolefin material and a conductive material can function as a PTC thermistor layer and its operating temperature range is suitably from 80° C. to 160° C. Thus the high temperature safety performance of the battery may be improved well. As the first type of polymer material of the safety coating, In the present disclosure, fluorinated polyolefin and/or chlorinated polyolefin material actually function in two ways, both as a PTC matrix and as a binder. Fluorinated polyolefin and/or chlorinated polyolefin as the first type of polymer material of the safety coating serves as both a PTC matrix and a binder, thereby facilitating the preparation of a thinner safety coating without affecting the adhesion of the safety coating.

In addition, the solvent (usually an oily solvent, such as NMP or the like) or the electrolyte in the positive active material layer over the safety coating may have an adverse effect such as dissolution, swelling and the like on the polymer material of the safety coating.

Therefore, in addition to fluorinated polyolefin and/or chlorinated polyolefin as a polymer matrix, the introduction of a second type of polymer material and fluorinated polyolefin and/or chlorinated polyolefin to form a mixed polymer matrix can further improve performance and stability of the PTC safety coating, wherein the solubility of the second type of polymer material in oil solvent (preferably NMP) is smaller than the solubility of the first type of polymer material and the weight percentage of the first type of polymer material is 17.5% or more.

If all of polymer matrices in safety coatings are the first type of polymer material of fluorinated polyolefin and/or chlorinated polyolefin, the following technical problems would easily occur:

(1) Since the fluorinated polyolefin and/or chlorinated polyolefin have a large dissolution and swelling in an organic oil solvent (such as NMP or the like) and an electrolyte, when the positive active material layer is applied over the safety coating, the positive active material layer is likely to be cracked due to uneven stress in the case of fast coating speed; and (2) Since the fluorinated polyolefin and/or chlorinated polyolefin have a large dissolution and swelling in an organic oil solvent (such as NMP or the like) and an electrolyte, the introduction of the safety coating causes a large increase of battery DCR (DC internal resistance), which is not conducive to the improvement of the dynamic performance of the battery.

Since in the oil solvent the solubility of the second type of polymer material is smaller than the solubility of the first type of polymer material, the above technical problems can be solved. That is to say, the second type of polymer material acts as a "difficultly soluble component" to hinder the too large dissolution and swelling of the safety coating in an organic solvent (such as NMP or the like) and an electrolyte, as such to solve the problem of cracking and excessive DCR growth.

Therefore, in embodiments of the present invention, the polymer matrix in the safety coating of the positive electrode plate comprises at least two types of polymer materials, wherein the first polymer material is fluorinated polyolefin and/or chlorinated polyolefin, and the solubility of the second type of polymer material in oil solvent (preferably in NMP) is smaller than the solubility of the first type of polymer material.

When the weight percentage of the first type of polymer material (relative to the total weight of the polymer matrix, the conductive material and the inorganic filler) is 17.5% or more, the safety coating works better for improving the safety performance during nail penetration of battery.

Secondly, the inventors have found that the introduction of an inorganic filler into the safety coating of the positive electrode plate can serve to stabilize the safety coating.

It has been found that in the case that the safety coating does not contain an inorganic filler, the solvent (such as NMP or the like) in the positive active material layer or the electrolyte over the safety coating may adversely dissolve and swell the polymer material in the safety coating, thereby damaging the safety coating and affecting its PTC effect. After adding an inorganic filler to the safety coating, the inorganic filler as a barrier can advantageously eliminate the above-mentioned adverse effects such as dissolution and swelling, and thus it is advantageous for stabilizing the safety coating. In addition, it has also been found that the addition of the inorganic filler is also advantageous for ensuring that the safety coating is not easily deformed during compaction of the electrode plate. Therefore, the addition of the inorganic filler can well ensure that the safety coating is stably disposed between the metal current collector and the positive active material layer and that the metal current collector is prevented from directly contacting the positive active material layer, thereby improving safety performance of the battery.

In summary, the inorganic filler can function as stabilizing the safety coating from the following two aspects: (1) hindering the electrolyte and the solvent (such as NMP, etc.) of the positive active material layer from dissolving or swelling the polymer material of the safety coating; and (2) guaranteeing that the safety coating is not easily deformed during the plate compaction process.

The inventors have also unexpectedly discovered that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero. However, usually the conductive network is partially recovered, when the inside of the safety coating reaches a dynamic balance. Therefore, after reaching a certain temperature for example, the operating temperature, the resistance of the safety coating is not as large as expected, and still there is very little current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can better produce PTC effect in the operating temperature range. That is to say, the increasing speed of resistance is faster and the PTC response speed is faster at a high temperature. Thus, the safety performance of battery can be improved better.

Therefore, in embodiments of the present disclosure, the safety coating of the positive electrode plate further contains an inorganic filler in addition to the polymer matrix and the conductive material.

The composition of the safety coating of the positive electrode plate of the present disclosure will be separately described below.

Polymer Matrix Material

The safety coating of the positive electrode plate of the disclosure adopts a mixed polymer matrix material composed of at least two types of polymer materials, wherein the first type of polymer material is fluorinated polyolefin and/or chlorinated polyolefin, and the solubility of the second type of polymer material in oil solvent is smaller than the solubility of the first type of polymer material; and wherein the weight percentage of the first type of polymer material relative to the total weight of the polymer matrix, the conductive material and the inorganic filler is 17.5% or more.

The second type of polymer material may be an oil-dispersible polymer material or a water-dispersible polymer material.

When the second type of polymer material is an oil-dispersible polymer material, the oil-dispersible polymer material is preferably selected from at least one of oil-dispersible polyacrylonitrile, oil-dispersible polyacrylic acid, oil-dispersible polyacrylate, oil-dispersible polyacrylic acid-acrylate, oil-dispersible polyacrylonitrile-acrylic acid and oil-dispersible polyacrylonitrile-acrylate.

When the second type of polymer material is a water-dispersible polymer material, the water-dispersible polymer material is preferably selected from at least one of water-dispersible polyacrylic acid, water-dispersible polyurethane, water-dispersible polyvinyl alcohol, water-dispersible PVDF, water-dispersible polyacrylate, water-dispersible polytetrafluoroethylene, and water-dispersible polyacrylonitrile.

In this application, the water-dispersible polymer material means that the polymer molecular chain is completely extended and dispersed in water, and the oil-dispersible polymer material means that the polymer molecular chain is completely extended and dispersed in the oil solvent. Those skilled in the art understand that by using a suitable surfactant, the same type of polymer material can be dispersed in water and oil, respectively. That is to say, by using a suitable surfactant, the same type of polymer material can be made into a water-dispersible polymer material or an oil-dispersible polymer material, respectively. For example, those skilled in the art can appropriately select water-dispersible polyacrylonitrile or oil-dispersible polyacrylonitrile as the second type of polymer material, or select water-dispersible polyacrylate or oil-dispersible polyacrylate as the second type of polymer material.

If the solubility of the fluorinated polyolefin and/or chlorinated polyolefin polymer material such as PVDF or PVDC in NMP is 100%, the solubility of the preferred second type of polymer material in NMP is substantially no more than 30%. For example, the solubility of oil-dispersible polyacrylonitrile in NMP is about 8%, and that of oil-dispersible polyacrylate in NMP is 15%; the solubility of water-dispersible polymer materials such as water-dispersible polyacrylic acid, water-dispersible polyurethane, and water-dispersible polyvinyl alcohol in NMP is no more than 5%.

Since the addition of the water-dispersible polymer material as the second type of polymer material may increase the brittleness of the coating, which is disadvantageous to the improvement of the safety performance of the battery and to the improvement of the cycle life, it is preferred to add the oil-dispersible polymer material as the second type of polymer material.

Relative to the total weight of the polymer matrix, the conductive material and the inorganic filler, the weight percentage of the polymer matrix is 35 wt. % to 75 wt. %, preferably 40 wt. % to 75 wt. %, and more preferably 50 wt. % to 75 wt. %.

In this application, the fluorinated polyolefin and/or chlorinated polyolefin of the first type of polymer material refers to polyvinylidene fluoride (PVDF), polyvinylidene chloride (PVDC), modified PVDF, and/or modified PVDC. For example, the first type of polymer material may be selected from PVDF, carboxylic acid modified PVDF, acrylic acid modified PVDF, PVDF copolymer, PVDC, carboxylic acid modified PVDC, acrylic acid modified PVDC, PVDC copolymer, or any mixture thereof.

In some preferred embodiments of the invention, the polymer matrix is substantially free of other binders ("substantially free" means the content is ≤3%, ≤1%, or ≤0.5%).

In some preferred embodiments of the invention, the polymeric matrix is at least partially crosslinked. It has been found that the cross-linking treatment increases the bonding force between the safety coating and the current collector, and in case of an abnormal situation such as nailing, the safety coating may tightly wrap the current collector and the burrs generated in the current collector, thereby improving the safety performance during nail penetration of the current collector and the electrochemical devices. In addition, since the crosslinking treatment may further reduce the swelling and dissolution of the polymer material, the occurrence of cracking may also be reduced, and the DCR of the battery may be improved. Therefore, the cross-linking treatment may improve the safety performance during nail penetration, prevent cracking, and improve stability.

The crosslinking treatment may be achieved by introducing a crosslinking agent into the slurry of the safety coating and then performing crosslinking and curing, for example, by heating.

Inorganic Filler

The inorganic filler is present in a weight percentage of 10 wt % to 60 wt % based on the total weight of the polymer matrix, the conductive material and the inorganic filler. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

When the particle size of the inorganic filler is too small, it will have increased specific surface area and thus side reaction will increase; when the particle size of the inorganic filler is too large, the application thickness of the safety coating is too large and the coating is not easy to be even. Preferably, the average particle diameter D of the inorganic filler in the safety coating fulfils the relationship of 100 nm≤D≤10 μm, more preferably 1 μm≤D≤6 μm. When the particle size of the inorganic filler is in the above range, it may also improve the effect of blocking the conductive network at high temperature, thereby improving the response speed of the safety coating. Further preferably, the inorganic filler in the safety coating has a specific surface area (BET) of not more than 500 m$^2$/g. When the specific surface area of the inorganic filler increases, side reaction will increase and thus the battery performance will be affected. Moreover, in the case that the specific surface area of the inorganic filler is too large, a higher proportion of binder will be required to be consumed, which will cause the binding force among the safety coating, the current collector and the positive active material layer to be reduced and the growth rate of the internal resistance to be high. When the specific surface area (BET) of the inorganic filler is not more than 500 m$^2$/g, a better overall effect can be provided.

The inorganic filler is selected from at least one of a metal oxide, a non-metal oxide, a metal carbide, a non-metal carbide, and an inorganic salt, or at least one of a conductive carbon coating modified above material, a conductive metal coating modified above material or a conductive polymer coating modified above material.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, lithium titanate, or at least one of a conductive carbon coating modified above material, a conductive metal coating modified above material or a conductive polymer coating modified above material.

Especially, the inventors have found that it is particularly advantageous when a positive electrochemically active material or a conductive carbon coating modified above material, a conductive metal coating modified above material or a conductive polymer coating modified above material is used as an inorganic filler in the case that the safety coating is used for a positive electrode plate. In such a case, in addition to above mentioned functions as stabilizing the safety coating (hindering the solvent from the disadvantage influence such as dissolution and swelling of the polymer material and ensuring that the safety coating is not easily deformed) and as improving the performance such as the response speed and the like of the safety coating, the inorganic filler may further play the following two roles:

(1) to improve the overcharge performance of the battery. In the PTC safety coating system composed of a fluorinated polyolefin and/or chlorinated polyolefin polymer matrix and a conductive material, since the electrochemically active material has the characteristics of lithium ion intercalation, the electrochemically active material can be used as an "active site" in the conductive network at the normal operating temperature of the battery and thus the number of "active site" in the safety coating is increased. In the process of overcharging, the electrochemically active material will delithiate, the de-lithiating process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem of battery occurs. Thus the battery overcharge safety performance may be improved.

(2) to contribute charge and discharge capacity. Since the electrochemically active material can contribute a certain charge and discharge capacity at the normal operating temperature of the battery, the effect of the safety coating on the electrochemical performance such as capacity of the battery at the normal operating temperature can be dropped to the lowest.

Therefore, for the positive electrode plate, it is the most preferred to use a positive electrochemically active material or a conductive carbon coating modified above material, a conductive metal coating modified above material or a conductive polymer coating modified above material as the inorganic filler of the safety coating. The positive electrochemically active material is preferably selected from at least one of lithium cobalt oxide, lithium nickel manganese cobalt oxide, lithium nickel manganese aluminium oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganese oxide, spinel lithium nickel manganese oxide, and lithium titanate, or a conductive carbon coating modified above material, a conductive metal coating modified above material, a conductive polymer coating modified above material. Especially, the positive electrochemically active material is at least one of a conductive carbon coating modified above electrochemically active materials, such as conductive carbon coating modified lithium cobalt oxide, conductive carbon coating modified lithium nickel manganese cobalt oxide, conductive carbon coating modified lithium nickel manganese aluminium oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium manganese iron phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

As a further improvement in the present invention, when the conductivity σ of the inorganic filler satisfies $10^{-3}$ S/m≤σ≤$10^2$ S/m, it would produce an additional benefit. The inventors have found that the addition of inorganic fillers affects the conductive performance of the safety coating, which in turn may affect the conductivity of the whole electrode plate. When the conductivity σ of the inorganic filler satisfies $10^{-3}$ S/m≤σ≤$10^2$ S/m, the conductivity of the safety coating at the normal temperature of the battery can be improved. If the conductivity σ of the inorganic filler is too small, the initial internal resistance and internal resistance increasing rate of the safety coating will increase rapidly; if the σ is too high, the conductive network is not easily cut at the PTC operating temperature and thus the PTC material layer cannot works well. Within the above conductivity range, the internal resistance and its growth rate of the battery during normal use are high, and the conductive network can be quickly disconnected when an internal short circuit or a high temperature condition occurs.

Those skilled in the art can understand that if the conductivity σ of some inorganic fillers does not satisfy $10^{-3}$ S/m≤σ≤$10^2$ S/m, above requirement to the conductivity can be satisfied by the material modification or modification means commonly used in the art.

Conductive Material

Relative to the total weight of the polymer matrix, the conductive material and the inorganic filler, the weight percentage of the conductive material is 5 wt. % to 25 wt. %, preferably 5 wt. % to 20 wt. %

The conductive material is selected from at least one of a conductive carbon-based material, a conductive metal material, and a conductive polymer material, wherein the conductive carbon-based material is selected from at least one of conductive carbon black, acetylene black, graphite, graphene, carbon nanotubes, carbon nanofibers; the conductive metal material is selected from at least one of Al powder, Ni powder, and gold powder; and the conductive polymer material is selected from at least one of conductive polythiophene, conductive polypyrrole, and conductive polyaniline. The conductive material may be used alone or in combination of two or more.

Conductive materials are typically used in the form of powders or granules. The particle size may be 5 nm to 500 nm, for example, 10 nm to 300 nm, 15 nm to 200 nm, 15 nm to 100 nm, 20 nm to 400 nm, 20 nm to 150 nm, or the like, depending on the specific application environment.

Safety Coating

The safety coating in the positive electrode plate of the present invention works as below. At a normal temperature, the safety coating relies on a good conductive network formed between the conductive materials to conduct electron conduction. When the temperature rises, the volume of the polymer matrix material begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero, thereby protecting the electrochemical device that uses the safety coating.

The safety coating in the positive electrode plate of according to this application can be formed by a conventional method. For example, the polymer matrix material, the conductive material, the inorganic filler and optionally other auxiliary agents are dissolved in a solvent and stirred to form a slurry, and then the slurry is applied onto the current collector and heated, thus the desired safety coating is obtained by drying.

In the positive electrode plate of the present invention, the safety coating is directly adhered to current collector and disposed between current collector and positive active material layer. The thickness H of the safety coating can be reasonably determined according to actual needs. The thickness H of the safety coating is usually not more than 40 μm, preferably not more than 25 μm, more preferably not more than 20 μm, 15 μm or 10 μm. The thickness of the safety coating is usually greater than or equal to 1 μm, preferably greater than or equal to 2 μm, and more preferably greater than or equal to 3 μm. If the thickness is too small, it is not enough to ensure that the safety coating has the effect of improving safety performance of the battery; if it is too large, the internal resistance of the battery will increase seriously, which will affect electrochemical performance of the battery during normal operation. Preferably, 1 μm≤H≤20 μm, more preferably 3 μm≤H≤10 μm.

When the second type of polymer material is an oil-dispersible polymer material, it is preferred that the weight ratio of the polymer matrix material (the sum of the weight of the first type of polymer material and the oil-dispersible polymer material of the second type of polymer material) to the conductive material in the safety coating is 2 or more.

When the second type of polymer material is a water-dispersible polymer material, it is preferred that the weight ratio of the first type of polymer material in the polymer matrix material to the conductive material in the safety coating is 2 or more.

The bonding force between the safety coating and the current collector is preferably at least 10 N/m. Larger bonding force can prevent cracking of the film layer. For example, the bonding force between the safety coating and the current collector can be increased by introducing an additional binder or by crosslinking the polymer matrix.

In addition, in some preferred embodiments of the present invention, the safety coating in the positive electrode plate of the present invention may consist essentially of the polymer matrix, the conductive material, and the inorganic filler, which is free of a significant amounts (e.g., ≤3%, ≤1%), or ≤0.5%) of other components.

Current Collector

For the current collector, the common materials in the art, preferably metal current collectors, such as metal flakes or metal foils of stainless steel, aluminum, copper, titanium or the like can be used. Preferably, the current collector is an aluminum-containing porous current collector (for example, a porous aluminum foil). Use of the porous aluminum foil can reduce the probability of occurrence of the metal burrs and further reduce the probability of occurrence of a severe aluminothermic reaction in an abnormal situation such as nailing. Therefore, safety performance of the battery may be further improved. In addition, use of porous aluminum foil can also improve infiltration of the electrolyte to the electrode plate, and thereby improve the dynamic performance of the lithium ion battery. The safety coating can cover the surface of the porous aluminum foil to prevent leakage of the active material layer during the coating process.

Further, in consideration of the safety performance during nail penetration, the elongation at break δ of the current collector is preferably 0.8%≤δ≤4%. It was found that if the elongation at break of the current collector is too large, the metal burrs will be larger when puncture, which is not conducive to improving safety performance of the battery. Conversely, if the elongation at break of the current collector is too small, breakage is likely to occur during processing such as plate compaction or when the battery is squeezed or collided, thereby degrading quality or safety performance of the battery. Therefore, in order to further improve safety performance, particularly safety performance during nail penetration, the elongation at break δ of the current collector should be no more than 4% and not less than 0.8%. The elongation at break of the metal current collector can be adjusted by changing purity, impurity content and additives of the metal current collector, the billet production process, the rolling speed, the heat treatment process, and the like.

Positive Active Material Layer

As the positive active material layer used for the present positive electrode plate of the present invention, various positive active material layers known in the art can be selected, and the constitution and preparation method thereof are well known in the art without any particular limitation. The positive active material layer contains a positive active material, and various positive active materials for preparing a lithium ion secondary battery positive electrode known to those skilled in the art may be used. For example, the positive active material is a lithium-containing composite metal oxide, for example one or more of $LiCoO_2$, $LiNiO_2$, $LiMn_2O_4$, $LiFePO_4$, lithium nickel cobalt manganese oxide (such as $LiNi_{0.5}Co_{0.2}Mn_{0.3}O_2$) and one or more of lithium nickel manganese oxide.

When the positive electrode electrochemically active material (or a coating modified material thereof) is used as the inorganic filler of the safety coating of the positive electrode plate, the positive electrochemically active material in the safety coating and the positive active substance used in the positive electrode active material layer may be the same or different.

The negative electrode plate for use in conjunction with the positive electrode plate of the present invention may be selected from various conventional negative electrode plates in the art, and the constitution and preparation thereof are well known in the art. For example, the negative electrode plate may comprises a negative electrode current collector and a negative active material layer disposed on the negative electrode current collector, and the negative active material layer may comprise a negative active material, a binder, a conductive material, and the like. The negative active material is, for example, a carbonaceous material such as graphite (artificial graphite or natural graphite), conductive carbon black, carbon fiber, or the like, a metal or a semimetal material such as Si, Sn, Ge, Bi, Sn, In, or an alloy thereof, and a lithium-containing nitride or a lithium-containing oxide, a lithium metal or a lithium aluminum alloy.

The present invention also discloses an electrochemical device, comprising the positive electrode plate according to the present invention. The electrochemical device may be a capacitor, a primary battery or a secondary battery, for example a lithium-ion capacitor, a lithium-ion battery or a sodium-ion battery. In addition to the use of the positive electrode plate as described above, the construction and preparation methods of these electrochemical devices are known per se. Due to the use of the positive electrode plate as described above, the electrochemical device can have improved safety (e.g., during nail penetration) and electrical performances. Furthermore, the positive electrode plate according to this application can be easily processed, so that the manufacturing cost of the electrochemical device can be reduced by using the positive electrode plate according to the present invention.

Those skilled in the art will appreciate that various definition or preferred ranges of the component selection, component content, and material physicochemical properties in the safety coating in the various embodiments of the invention mentioned above can be combined arbitrarily. Various embodiments of the present invention mentioned above by such a combination are still within the scope of the invention and are considered as part of the disclosure of this specification.

EXAMPLES

In order to make the objects, the technical solutions and the beneficial technical effects of the present invention more clear, the present invention will be described in further detail below with reference to the embodiments. However, it is to be understood that embodiments of the present invention are only intended to be illustrative of the present invention, and are not intended to limit the invention, and embodiments of the present invention are not limited to those embodiments given in the specification. The experimental conditions not indicated in the examples may refer to conventional conditions, or the conditions recommended by the material supplier or equipment supplier.

1. Preparation Method 1.1 Preparation of Positive Electrode Plate

1) Safety Coating

A certain ratio of a polymer matrix material, a conductive material, and an inorganic filler were mixed with N-methyl-2-pyrrolidone (NMP) as a solvent with stirring uniformly, which was then coated on both sides of metal current collector, followed by drying at 85° C. to obtain a safety coating.

2) Positive Active Material Layer

Then, 90 wt % of a positive active material, 5 wt % of SP, and 5 wt % of PVDF were mixed with NMP as a solvent with stirring uniformly, which was then coated on the safety coating of the current collector as prepared according to the above method followed by drying at 85° C. to obtain a positive active material layer.

3) Work Up

Then, the current collector with safety coating and positive active material layer was cold-pressed, then trimmed, cut, and stripped, followed by drying under vacuum at 85° C. for 4 hours. After welding, the positive electrode plate meeting the requirements of the secondary battery was obtained.

The main materials used in the specific examples were as follows:

First type of polymer material: PVDF (Manufacturer "Solvay", model 5130), PVDC;

Second type of polymer material: oil-dispersible polyacrylonitrile, water-dispersible polyacrylic acid, water-dispersible polyurethane, water-dispersible polyvinyl alcohol;

Conductive material (conductive agent): Super-P (TIMCAL, Switzerland, abbreviated as SP);

Inorganic filler: alumina, lithium iron phosphate (abbreviated as LFP), carbon coating modified lithium iron phosphate (abbreviated as LFP/C), carbon coating modified lithium titanate (abbreviated as $Li_4Ti_5O_{12}/C$);

Positive active material: NCM811 ($LiNi_{0.8}Co_{0.1}Mn_{0.1}O_2$).

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative electrode current collector in the form of copper foil, and dried at 85° C., then trimmed, cut, and stripped, followed by drying under vacuum at 110° C. for 4 hours. After welding, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed organic solvent at a concentration of 1 mol/L to prepare an electrolyte.

1.4 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h. After that, the battery core was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery core was charged to 3.8V with a constant current of 0.1 C, thereby completing the preparation of the secondary battery.

2. Tests for Material Performances

In each of the examples and comparative examples, the physical property parameters of the materials were measured by the common method in the art, unless otherwise specified.

Some specific parameters were tested using the following methods.

2.1 Particle Size

The power sample was dispersed in a dispersing medium (distilled water), which was measured with a Malvern laser particle size analyzer MS2000 for 5 times and averaged in unit of μm.

2.2 BET (Specific Surface Area)

The specific surface area of the powder sample of the test material was measured with a Quadrasorb SI specific surface tester for 5 times and averaged in unit of $m^2/g$.

2.3 Binding Force Between Film Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by 0.02 to calculate the binding force (N/m).

2.4 Elongation at Break of Current Collector

Two samples having a length of 200 mm and a width of 15 mm were taken from the current collector. The sample was then mounted on a tensile machine (model AI7000) and the two tests were averaged as the test result. Record the initial length L0, and start the tensile machine, until the sample broke, and read the displacement L1 of the sample at break from the tensile machine. Elongation at break=(L1−L0)/L0*100%.

2.5 Thickness of the Current Collector, Thickness of the Coating and Thickness of the Film Layer Thickness of the current collector was measured by a micrometer at 5 points and averaged.

Thickness of the coating and thickness of the film layer: first measure the thickness of the current collector, and then measure the total thickness of the current collector with the coating. The difference between the two values was used as the thickness of the coating. A similar method was used for the thickness of the film layer.

2.6 Cracking of the Coating

After drying and obtaining a positive active material layer, if no cracks were observed in the 100 $m^2$ electrode plate, it was defined as no cracking; if the number of occurrences of cracks in 100 $m^2$ electrode plate was ≤3, it was defined as mild cracking; if the number of occurrences of cracks in 100 $m^2$ electrode plate was >3, it was defined as severe cracking.

2.7 Solubility of Polymer Material in Oil Solvent

The polymer material was made into a binding film having a thickness of about 7 μm, then cut into 20 mm*50 mm strips, weighed and recorded as M1;

The binding film was placed in NMP (N-methylpyrrolidone) solvent, set at 130° C. for 5 min, taken out, and vacuum dried at 100° C. After drying, it was weighed and recorded as M2;

Then solubility was calculated as =(M1−M2)/M1*100%

In the present invention, for convenience of comparison, the solubility of PVDF (manufacturer "Solvay", model 5130) was used as a control, and it was recorded as 100%. The ratio of the solubility of other materials to the solubility of PVDF was recorded.

3. Test for Battery Performance

The safety performances of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/s in the direction perpendicular to the battery plate. The puncture position should be close to the geometric center of the surface to be punctured, the steel needle stayed in the battery, and then observe if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach 1.5 times the charging cut-off voltage or after charging with a constant current of 1 C for 1 hour, the charging was terminated.

3.3 Cycle Performance Test:

The test conditions for the cycle performance test were as follows: the secondary battery was subjected to a 1 C/1 C cycle test at 25° C. in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery core was tested (discharging with a current of 4 C for 10 s). Then, the battery core was placed at 130° C. for 1 h followed by testing the DC resistance, and calculating the DC resistance growth rate. Then, the battery core was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In the present invention, for convenience of comparison, the DCR of the battery core containing only the first type of polymer material (i.e. PVDF) as polymer matrix was used as a control, and was recorded as 100%, and the DCR of the other battery cores and the ratio thereof were calculated and recorded.

4. Performance Test Results 4.1 Protection Performance (PTC Effect) of Safety Coating and Effect Thereof on Battery Performance In order to confirm the protection performance of safety coating, the corresponding safety coating, positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (10 samples for the puncture test) and tested independently. The final test results were averaged and shown in Tables 1-2 and 1-3.

In the test, the conventional electrode plate CPlate P was prepared with the method described in "1.1 Preparation of positive electrode plate", but the safety coating was not provided. That is to say, a positive active material was directly applied over the current collector. The conventional electrode plate Cplate N was prepared according to the method described in "1.2 Preparation of negative electrode plate".

TABLE 1-1

Compositions of electrode plate

| | | | Composition of the safety coating | | | | | | |
|---|---|---|---|---|---|---|---|---|---|
| | Current collector | Positive active material | Polymer matrix material | wt % | Conductive material | wt % | Inorganic filler material | wt % | Thickness of safety coating H (μm) |
| CPlate P | Al foil | NCM811 | / | / | / | / | / | / | / |
| Comp. Plate CP | Al foil | NCM811 | PVDF | 90 | SP | 10 | / | / | 20 |
| Plate 1 | Al foil | NCM811 | PVDC | 35 | SP | 10 | alumina | 55 | 10 |
| Plate 2 | Al foil | NCM811 | PVDF | 35 | SP | 10 | LFP | 55 | 3 |

TABLE 1-2

Performance of lithium-ion battery

| Battery No. | Positive electrode | Negative electrode | Puncture Test |
|---|---|---|---|
| Battery 1 | CPlate P | CPlate N | 10 fail |
| Battery 2 | Comp. Plate CP | CPlate N | 2 pass, 8 fail |
| Battery 3 | Plate 1 | CPlate N | 10 pass |
| Battery 4 | Plate 2 | CPlate N | 10 pass |

TABLE 1-3

Performance of lithium-ion battery

| Battery No. | Positive electrode | Negative electrode | DC resistance growth rate @ 130° C., 1 h | DC resistance growth rate @ 130° C., 2 h |
|---|---|---|---|---|
| Battery 2 | Comp. Plate CP | CPlate N | 20% | 30% |
| Battery 4 | Plate 2 | CPlate N | 1200% | 1500% |

The data in Table 1-1 and Table 1-2 indicated that the safety coating with PVDF or PVDC as a polymer matrix can significantly improve the safety performance of the battery during nail penetration, especially in the case that an inorganic filler is added. The growth of DCR data in Table 1-3 indicated that the safety coating composed of PVDF and a conductive material does have a PTC effect, and the addition of the inorganic filler can significantly improve the DCR growth of the battery at a high temperature, that is, the PTC effect is more remarkable.

4.2 Effect of the Content of each Component Contained in the Safety Coating

In order to further study the effect of the content of each component contained in the safety coating, the corresponding safety coating, positive electrode plate, negative electrode plate and battery were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (10 samples for the puncture test or overcharge test) and tested independently. The final test results were averaged and shown in Table 2-2.

Table 2-1. Compositions of Electrode Plate

TABLE 2-1

Compositions of electrode plate

| | Current collector | Positive active material | Polymer matrix material | wt % | Conductive material | wt % | Inorganic filler material | wt % | Thickness of safety coating H (μm) |
|---|---|---|---|---|---|---|---|---|---|
| Comp. Plate 2-1 | Al foil | NCM811 | PVDF | 75 | SP | 20 | alumina | 5 | 8 |
| Plate 2-2 | Al foil | NCM811 | PVDF | 75 | SP | 15 | alumina | 10 | 8 |
| Plate 2-3 | Al foil | NCM811 | PVDF | 75 | SP | 10 | alumina | 15 | 8 |
| Plate 2-4 | Al foil | NCM811 | PVDF | 60 | SP | 10 | alumina | 30 | 8 |
| Plate 2-5 | Al foil | NCM811 | PVDF | 60 | SP | 8 | alumina | 32 | 8 |
| Plate 2-6 | Al foil | NCM811 | PVDF | 55 | SP | 15 | alumina | 30 | 8 |
| Plate 2-7 | Al foil | NCM811 | PVDF | 50 | SP | 25 | alumina | 25 | 8 |
| Plate 2-8 | Al foil | NCM811 | PVDF | 40 | SP | 15 | alumina | 45 | 8 |
| Plate 2-9 | Al foil | NCM811 | PVDF | 35 | SP | 5 | alumina | 60 | 8 |
| Comp. Plate 2-10 | Al foil | NCM811 | PVDF | 25 | SP | 5 | alumina | 70 | 8 |

TABLE 2-2

Performance of lithium-ion batteries

| Battery | Positive electrode | Negative electrode | Puncture Test | Cycle Life (cycle) |
|---|---|---|---|---|
| Battery 6 | Comp. Plate 2-1 | CPlate N | 5 fail, 5 pass | 2502 |
| Battery 7 | Plate 2-2 | CPlate N | 10 pass | 2351 |

TABLE 2-2-continued

Performance of lithium-ion batteries

| Battery | Positive electrode | Negative electrode | Puncture Test | Cycle Life (cycle) |
|---|---|---|---|---|
| Battery 8 | Plate 2-3 | CPlate N | 10 pass | 2205 |
| Battery 9 | Plate 2-4 | CPlate N | 10 pass | 2251 |
| Battery 10 | Plate 2-5 | CPlate N | 10 pass | 2000 |
| Battery 11 | Plate 2-6 | CPlate N | 10 pass | 2408 |
| Battery 12 | Plate 2-7 | CPlate N | 10 pass | 2707 |
| Battery 13 | Plate 2-8 | CPlate N | 10 pass | 2355 |
| Battery 14 | Plate 2-9 | CPlate N | 10 pass | 1800 |
| Battery 15 | Comp. Plate 2-10 | CPlate N | 4 fail, 6 pass | 1715 |

The data in Table 2-1 and Table 2-2 show that: (1) If the content of the inorganic filler is too low, the stability of the safety coating is not high, so safety performance of the battery cannot be fully improved; if the content of the inorganic filler is too high, the content of the polymer matrix is too low, so that the safety coating cannot exert its effect; (2) the conductive material has a great influence on the internal resistance and polarization of the battery, so it would affect the cycle life of the battery. The higher the content of the conductive material, the smaller the internal resistance and polarization of the battery is so that the cycle life will be better.

It had been found through experiments that the appropriate content range of each component in the safety coating is as follows:

the weight percentage of the polymer matrix is 35 wt % to 75 wt %;

the weight percentage of the conductive material is 5 wt % to 25 wt %; and the weight percentage of the inorganic filler is from 10 wt % to 60 wt %.

As long as the content of each component in the safety coating is within the above range, the effect of improving the safety and electrical performance (e.g., cycle performance) of the battery can be achieved.

4.3 Effect of the Kind of the Inorganic Filler on Battery Performance

In order to further study the effect of materials in the safety coating on performances of the electrode plate and the battery, the corresponding safety coating, positive electrode plate, negative electrode plate and battery were prepared with the specific materials and amounts listed in Table 3-1 below according to the methods and procedures described in "1. Preparation method", and were tested according to the method specified in "3. Test for battery performance". In order to ensure accuracy of data, 4 samples were prepared for each battery (10 samples for the puncture test or overcharge test) and tested independently. The final test results were averaged which were shown in Table 3-2.

The data in Tables 3-1 and 3-2 show that compared to other materials (such as alumina), the electrochemically active material can significantly improve the overcharge safety performance of the battery. In addition, carbon coating modified electrochemically active material also can improve the cycle life of the battery.

TABLE 3-1

Compositions of electrode plate

| | | Composition of safety coating | | | | | | | |
|---|---|---|---|---|---|---|---|---|---|
| | | | | | | Inorganic filler | | Carbon content | Thickness of safety coating H |
| | Current collector | Positive active material | Polymer matrix | | Conductive material | | | | |
| | | | Material | wt % | Material | wt % | Material | wt % | (wt %) | (μm) |
| Plate 2-41 | Al foil | NCM811 | PVDF | 60 | SP | 10 | alumina | 30 | / | 8 |
| Plate 2-42 | Al foil | NCM811 | PVDF | 60 | SP | 10 | LFP | 30 | / | 8 |
| Plate 2-43 | Al foil | NCM811 | PVDF | 60 | SP | 10 | LFP/C | 30 | 1 | 8 |
| Plate 2-44 | Al foil | NCM811 | PVDF | 60 | SP | 10 | LFP/C | 30 | 2 | 8 |
| Plate 2-45 | Al foil | NCM811 | PVDF | 60 | SP | 10 | LFP/C | 30 | 3 | 8 |
| Plate 2-46 | Al foil | NCM811 | PVDF | 60 | SP | 10 | $Li_4Ti_5O_{12}/C$ | 30 | 5 | 8 |

TABLE 3-2

Performances of lithium-ion batteries

| Battery | Positive electrode | Negative electrode | Puncture Test | Overcharge Test | Cycle test (cycle) |
|---|---|---|---|---|---|
| Battery 46 | Plate2-41 | CPlate N | 10 pass | No pass | 2200 |
| Battery 47 | Plate2-42 | CPlate N | 10 pass | 10 pass | 2300 |
| Battery 48 | Plate2-43 | CPlate N | 10 pass | 10 pass | 2500 |
| Battery 49 | Plate2-44 | CPlate N | 10 pass | 10 pass | 2700 |
| Battery 50 | Plate2-45 | CPlate N | 10 pass | 10 pass | 2900 |
| Battery 51 | Plate2-46 | CPlate N | 10 pass | 10 pass | 3000 |

4.4 Effects of the Introduction of the Second Type of Polymer Material on Battery Performance In order to further study the effect of polymer matrix materials in the safety coating on performances of the electrode plate and the battery, the corresponding safety coating, positive electrode plate, negative electrode plate and battery were prepared with the specific materials and amounts listed in Table 4-1 below according to the methods and procedures described in "1. Preparation method", and were tested according to the method specified in "3. Test for battery performance". In order to ensure accuracy of data, 4 samples were prepared for each battery (10 samples for the puncture test) and tested independently. The final test results were averaged which were shown in Table 4-2.

TABLE 4-1

Compositions of electrode plate

| | | Composition of the safety coating | | | | | | | | |
|---|---|---|---|---|---|---|---|---|---|---|
| | | | Polymer matrix | | | Conductive material | | Inorganic filler | | Thickness of safety coating H |
| Electrode plate | Positive active material | First type of polymer | wt % | Second type of polymer | wt % | material | wt % | material | wt % | Carbon content (wt %) | (μm) |
| Plate 2-61 | Positive | NCM811 | PVDF | 60 | / | / | SP | 10 | LFP/C | 30 | 1 | 8 |
| Plate 2-62 | Positive | NCM811 | PVDF | 50 | water-dispersible polyacrylic acid | 10 | SP | 10 | LFP/C | 30 | 1 | 8 |
| Plate 2-63 | Positive | NCM811 | PVDF | 40 | water-dispersible polyurethane | 20 | SP | 10 | LFP/C | 30 | 1 | 8 |
| Plate 2-64 | Positive | NCM811 | PVDF | 30 | water-dispersible polyvinyl alcohol | 30 | SP | 10 | LFP/C | 30 | 1 | 8 |
| Plate 2-65 | Positive | NCM811 | PVDF | 40 | oil-dispersible polyacrylate | 20 | SP | 10 | LFP/C | 30 | 1 | 8 |
| Plate 2-66 | Positive | NCM811 | PVDF | 30 | oil-dispersible polyacrylate | 30 | SP | 10 | LFP/C | 30 | 1 | 8 |

TABLE 4-1-continued

Compositions of electrode plate

Composition of the safety coating

| Electrode plate | Positive active material | Polymer matrix | | | | Conductive material | | Inorganic filler | | Carbon content (wt %) | Thickness of safety coating H (μm) |
|---|---|---|---|---|---|---|---|---|---|---|---|
| | | First type of polymer | wt % | Second type of polymer | wt % | material | wt % | material | wt % | | |
| Plate 2-67 | Positive | NCM811 | PVDF | 25 | oil-dispersible polyacrylic acid | 35 | SP | 10 | LFP/C | 30 | 1 | 8 |
| Plate 2-68 | Positive | NCM811 | PVDF | 20 | oil-dispersible polyacrylic acid | 40 | SP | 10 | LFP/C | 30 | 1 | 8 |

TABLE 4-2

Performances of lithium-ion batteries

| Battery | Positive electrode plate | Negative electrode plate | Puncture Test | Cracking (coating speed of 50 m/min) | Battery DCR |
|---|---|---|---|---|---|
| Battery 61 | Plate 2-61 | CPlate N | 10 pass | Severe cracking | 100% |
| Battery 62 | Plate 2-62 | CPlate N | 9 pass, 1 fail | No cracking | 55% |
| Battery 63 | Plate 2-63 | CPlate N | 8 pass, 2 fail | No cracking | 50% |
| Battery 64 | Plate 2-64 | CPlate N | 7 pass, 3 fail | No cracking | 40% |
| Battery 65 | Plate 2-65 | CPlate N | 10 pass | No cracking | 90% |
| Battery 66 | Plate 2-66 | CPlate N | 10 pass | No cracking | 70% |
| Battery 67 | Plate 2-67 | CPlate N | 10 pass | No cracking | 64% |
| Battery 68 | Plate 2-68 | CPlate N | 10 pass | No cracking | 60% |

As shown by the data in Table 4-1 and Table 4-2, when the safety coating does not contain the second type of polymer material (that is, the solubility in the oil solvent is smaller than that of the first type of polymer material), the electrode plate is severely cracked. When the safety coating comprises the second type of polymer material, the degree of cracking of the electrode plate is obviously improved. This was because that the second type of polymer material used as the "difficultly soluble component" greatly reduced the dissolution and swelling of the first type of polymer material (such as PVDF) contained in the safety coating caused by the organic oil solvent (such as NMP) in the upper active material slurry, thereby reducing cracking and significantly increasing production efficiency. Moreover, when the second type of polymer material is mixed into the safety coating, the safety performance of the lithium-ion battery during nail penetration is not influenced. This indicates that when the combination of the first type of polymer material (PVDC and/or PVDF) and the second type of polymer material (preferably oil-dispersible polymer material) is used as the polymer matrix material of the safety coating, the overall performance of the battery is better.

It will be understood by those skilled in the art that the above application examples of the electrode plate of the present invention are only exemplified to be used for a lithium battery, but the electrode plate of the present invention can also be applied to other types of batteries or electrochemical devices, and still may produce good technical effect of the present invention.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

What is claimed is:

1. A positive electrode plate comprising a current collector, a positive active material layer and a safety coating disposed between the current collector and the positive active material layer, wherein the safety coating comprises a polymer matrix, a conductive material and an inorganic filler and wherein the polymer matrix comprises at least two types of polymer materials, and first type of polymer material is polyvinylidene fluoride, and solubility of second type of polymer material in oil solvent is smaller than the solubility of the first type of polymer material; the second type of polymer material is an oil-dispersible polymer material selected from at least one of oil-dispersible polyacrylic acid and oil-dispersible polyacrylate; and wherein the weight percentage of the first type of polymer material relative to total weight of the polymer matrix, the conductive material and the inorganic filler is from 20 wt % to 40 wt %; and wherein the inorganic filler of the safety coating is at least one of a conductive carbon coating modified material, a conductive metal coating modified material, or a conductive polymer coating modified material of lithium cobalt oxide, lithium nickel manganese cobalt oxide, lithium nickel manganese aluminium oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, or lithium titanate; and the inorganic filler has a conductivity σ satisfying $10^{-3}$ S/m≤σ≤$10^{2}$ S/m; and in the safety coating, the weight percentage of the inorganic filler is 30 wt. % to 60 wt. % relative to the total weight of the polymer matrix, the conductive material and the inorganic filler.

2. The positive electrode plate as claimed in claim 1, wherein in the safety coating, relative to the total weight of the polymer matrix, the conductive material and the inorganic filler, the weight percentage of the polymer matrix is 35 wt. % to 75 wt. %;

the weight percentage of the conductive material is 5 wt. % to 25 wt. %; and the weight percentage of the inorganic filler is 30 wt. % to 45 wt. %.

3. The positive electrode plate as claimed in claim 2, wherein the oil solvent is NMP.

4. The positive electrode plate as claimed in claim 1, wherein the conductive material is selected from at least one of a conductive carbon-based material, a conductive metal material, and a conductive polymer material, wherein the conductive carbon-based material is selected from at least one of conductive carbon black, acetylene black, graphite, graphene, carbon nanotubes, carbon nanofibers;

the conductive metal material is selected from at least one of Al powder, Ni powder, and gold powder; and the conductive polymer material is selected from at least one of conductive polythiophene, conductive polypyrrole, and conductive polyaniline.

5. The positive electrode plate as claimed in claim 1, wherein the inorganic filler has an average particle diameter D of 100 nm≤D≤μm.

6. The positive electrode plate as claimed in claim 1, wherein the inorganic filler has a specific surface area (BET) of not more than 500 m$^2$/g.

7. The positive electrode plate as claimed in claim 1, wherein relative to the total weight of the polymer matrix, the conductive material and the inorganic filler, the weight percentage of the polymer matrix is 50 wt. % to 75 wt. %; the weight percentage of the conductive material is 5 wt. % to 20 wt. %; and the weight percentage of the inorganic filler is 30 wt. % to 45 wt. %.

8. The positive electrode plate as claimed in claim 1, wherein the safety coating has a thickness H of 1 μm≤H≤20 μm; and the safety coating consists essentially of the polymer matrix, the conductive material, and the inorganic filler.

9. An electrochemical device comprising the positive electrode plate as claimed in claim 1, which is a capacitor, a primary battery or a secondary battery.

10. The positive electrode plate as claimed in claim 1, wherein the inorganic filler of the safety coating is at least one of a conductive carbon coating modified lithium cobalt oxide, a conductive carbon coating modified lithium nickel manganese cobalt oxide, a conductive carbon coating modified lithium nickel manganese aluminium oxide, a conductive carbon coating modified lithium iron phosphate, a conductive carbon coating modified lithium vanadium phosphate, a conductive carbon coating modified lithium cobalt phosphate, a conductive carbon coating modified lithium manganese phosphate, a conductive carbon coating modified lithium manganese iron phosphate, a conductive carbon coating modified lithium iron silicate, a conductive carbon coating modified lithium vanadium silicate, a conductive carbon coating modified lithium cobalt silicate, a conductive carbon coating modified lithium manganese silicate, a conductive carbon coating modified spinel lithium manganese oxide, a conductive carbon coating modified spinel lithium nickel manganese oxide, and a conductive carbon coating modified lithium titanate.

11. The positive electrode plate as claimed in claim 1, wherein the second type of polymer material is present in an amount ranging from 20 wt % to 40 wt % relative to total weight of the polymer matrix, the conductive material and the inorganic filler.

* * * * *